3,402,142
VINYL AROMATIC POLYMERS STABILIZED BY PHOSPHORUS COMPOUNDS

Archie E. Follett, Cary, N.C., assignor to Monsanto Company, a corporation of Delaware
No Drawing. Filed July 23, 1964, Ser. No. 384,801
5 Claims. (Cl. 260—45.75)

This invention relates to a novel process for improving the properties of crystalline polymerization products of vinyl aromatic hydrocarbons. The invention further relates to novel heat stable compositions.

Thermoplastic polymers of vinyl aromatic compounds have a tendency to discolor upon heating. It has been observed, for instance, that polystyrene frequently possesses an undesirable color when extruded from a melt. Extrusion of polymers such as polystyrene is usually accomplished by melting the polymer at a temperature of about 290° C. Because of the inherent instability to heat the dwell times of the melt at this temperature have been rather critical and are usually limited to under one minute. Where temperatures of the melt fluctuate substantially over 300° C. or where the dwell time is lengthened the polymers undergo rather serious color degradation.

It is an object of this invention to stabilize crystalline polymers of vinyl aromatic compounds against color degradation which occurs during melt extrusion of the polymers.

It is a further object of this invention to provide novel vinyl aromatic polymer compositions which are stable to heat and do not discolor upon prolonged heating above the melting point of the polymer.

It is a further object of this invention to provide novel vinyl aromatic polymer compositions which are stable to heat and do not discolor upon prolonged heating above the melting point of the polymer.

These and ther objects of the invention have been realized through the discovery that the tendency of a thermoplastic polymer of a vinyl aromatic compound to discolor upon prolonged exposure to heat can be overcome by blending with the polymer small amounts of certain organophosphorus compounds.

More particularly, it has been discovered that polymers of a vinyl aromatic compound, such as styrene, are stabilized against heat degradation by the incorporation in the polymer small amounts of a monocyclic aromatic or alkyl substituted phosphonous acid or phosphonic acid or the metal salts of such acids. The acids may further be identified by the formula

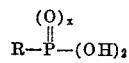

wherein $x$ is 0 or 1 and R is a radical selected from the group consisting of an alkyl radical and a monocyclic aromatic radical which may or may not be substituted by groups such as alkyl, alkoxy, hydroxy, nitro, halogen, acyloxy and the like. The metal cations of the salts of the acids may be selected from the group consisting of mono- and multivalent metal ions such as sodium, potassium, lithium, barium, calcium, manganese, lead, magnesium, zinc and the like. Particularly, desirable are those acid salts where the cations are selected from the alkali metals and alkaline earth metals.

Representative stabilizers are compounds such as sodium, para-chlorophenylphosphonite, lithium para-propoxyphenylphosphonite, manganous para-tolylphosphonite, calcium para-acetoxyphenylphosphonite, lithium para-hydroxyphenylphosphonite and lead meta-nitrophenylphosphonite, phenylphosphonic acid, sodium phenyl phosphonate, potassium p-methoxy phenylphosphonate, zinc p-bromo phenylphosphonate, magnesium p-isopropyl phenylphosphonate, octadecyl phosphonous acid, sodium ethyl phosphonite, dodecyl phosphonic acid and the like.

The salts of the phosphonous and phosphonic acids may be readily prepared by methathesis involving metal hydroxides or carbonates in a manner well known to those skilled in the art. The amount of the phosphorus compounds blended with the polymer has not been found to be critical. Permissible ranges are from about 0.001 to about 10 percent based on the weight of the polymer. However, the preferred range lies between about 0.01 to about 2 percent based on the weight of the polymer.

Although the above described phosphorus compounds have been found to provide efficient color stabilization in the polymers they may be used in combination with small amounts of other additives, such as phenolic compounds having the general formula

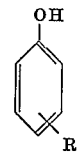

wherein R represents a substituent which may be hydroxyl or lower alkoxy. These phenols are oxygen scavengers and are believed to reduce the possibility of chain scission at elevated temperatures. The amount of a phenolic compound which may be incorporated into the polymer has not been found to be a critical aspect of this invention. Generally, from about 0.001 to about 5 percent based on the weight of the polymer may be employed. Amounts ranging from about 0.01 to about 2 percent based on the weight of the polymer may conveniently be employed. There appears to be no critical relationship with respect to the weight ratio of the two types of additives and normally where the phenolic additives are used in conjunction with the phosphorus stabilizers, equal proportions of the two are conveniently employed.

The manner of incorporating the additives into the polymer has not been found particularly critical. A convenient method for incorporating the stabilizers has been found to be by simply mixing a powdered form of the stabilizer with the polymer in powdered form. Of course the mixture should be made as homogeneous as possible.

The vinyl aromatic polymers to which this invention is applicable include crystalline homo- and copolymers of a wide range of vinyl aromatic monomers. Examples of these compounds are, notably, styrene and α-methylstyrene. Other such monomers are ring alkylated styrenes such as p-ethyl styrene, halogenated styrene such as α-chlorostyrene, p-chlorostyrene and 4-fluoro, α-fluorostyrene and vinyl polycyclic aromatic monomers such as vinyl naphthalene and the like. Copolymers of any two or more of such vinyl aromatic compounds with one another may also be stabilized by the process of this invention. The polymers, notably polystyrene, are used widely in commerce and well known to those skilled in the art.

The following examples are given to illustrate the invention but are not to be construed as limiting it in any manner.

EXAMPLES

To illustrate the stabilization of styrene polymers the following method was used. The additives were evaluated by blending the indicated amounts in 10 grams of the polymer. The composition was then placed in a 2.3 x 30 cm. glass tube having a 29/42 joint. The tube was fitted with a glass head for introducing a steady flow of nitrogen (Seaford Grade). Nitrogen flowed continuously for the first two hours at room temperature to sweep out the oxygen. The tube was then heated for 5 hours in a block which was thermostatically controlled at 290° C. The flow of nitrogen continued uninterruptedly. At the end of the heating period the polymers were examined visually and compared to the control.

| Polymer | Additive | Visual Appearance |
|---|---|---|
| 1. Polystyrene | Control | Clear, yellow. |
| 2. Polystyrene | Sodium phenylphosphonite, 0.1%. | Clear, colorless. |
| 3. Polystyrene | Control | Clear, yellow. |
| 4. Polystyrene | Manganous-phenylphosphonite, 0.1%. | Clear, colorless. |

The above examples illustrate that the composition of this invention may be heated for extended periods of time at highly elevated temperatures without suffering degrading effects evidenced by a yellow color in the polymer, thus enabling the extrusion of the polymers in the melt while maintaining the original color.

I claim:

1. A composition of matter which comprises a crystalline polymer selected from the group consisting of a homopolymer of a vinyl aromatic hydrocarbon monomer and copolymers of said vinyl aromatic hydrocarbon monomer with at least one other vinyl aromatic monomer and a stabilizing quantity of a compound selected from the group consisting of metal salts of compounds having the general formula

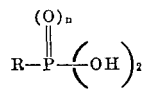

wherein R is a radical selected from the group consisting of alkyl and monocyclic aromatic radicals and $n$ is a member selected from the group consisting of 0 and 1, said metal being selected from the group consisting of an alkali metal, an alkaline earth metal, lead, zinc and manganese.

2. The composition of claim 1 wherein the metal is an alkali metal.

3. The composition of claim 1 wherein the metal is an alkaline earth metal.

4. A composition of matter which comprises crystalline polystyrene and from about 0.001 percent to about 10 percent based on the weight of the polymer of sodium phenylphosphonite.

5. A composition of matter which comprises a crystalline polystyrene and from about 0.001 percent to about 10 percent based on the weight of the polymer of manganous phenylphosphonite.

References Cited

UNITED STATES PATENTS

| 2,230,371 | 2/1941 | Bolton | 260—45.7 X |
| 2,784,169 | 3/1957 | Slocombe | 260—45.7 |
| 2,952,658 | 9/1960 | Pfeifer et al. | 260—45.7 |
| 2,959,568 | 11/1960 | Havens | 260—45.75 |
| 3,214,396 | 10/1965 | Schoepfle et al. | 260—45.7 X |

FOREIGN PATENTS

| 149,956 | 5/1955 | Sweden. |
| 621,316 | 8/1962 | Belgium. |

DONALD E. CZAJA, *Primary Examiner.*

M. J. WELSH, *Assistant Examiner.*